(12) United States Patent
Thompson et al.

(10) Patent No.: US 9,821,258 B2
(45) Date of Patent: Nov. 21, 2017

(54) FILTER ELEMENT WAVE SEAL GLAND

(71) Applicant: Parker-Hannifin Corporation, Cleveland, OH (US)

(72) Inventors: Dominic Thompson, Newcastle upon Tyne (GB); Daniel P. Rapin, Schoolcraft, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 302 days.

(21) Appl. No.: 14/578,558

(22) Filed: Dec. 22, 2014

(65) Prior Publication Data

US 2015/0101295 A1    Apr. 16, 2015

Related U.S. Application Data

(63) Continuation-in-part of application No. 13/305,894, filed on Nov. 29, 2011, now Pat. No. 8,916,044.
(Continued)

(51) Int. Cl.
*B01D 29/54* (2006.01)
*B01D 29/58* (2006.01)
(Continued)

(52) U.S. Cl.
CPC ......... *B01D 46/0023* (2013.01); *B01D 29/54* (2013.01); *B01D 29/58* (2013.01);
(Continued)

(58) Field of Classification Search
None
See application file for complete search history.

(56) References Cited

U.S. PATENT DOCUMENTS 2,418,777 A    4/1947  LeClair
3,246,920 A    4/1966  Pall .............................. 285/237
(Continued)

FOREIGN PATENT DOCUMENTS

DE           100 52 524       4/2002
DE       20 2007 018076 U1    5/2009
(Continued)

OTHER PUBLICATIONS

Extended European Search Report for corresponding European Application No. 16166036.0 dated Jul. 27, 2016.
(Continued)

*Primary Examiner* — Benjamin M Kurtz
(74) *Attorney, Agent, or Firm* — Renner, Otto, Boisselle & Sklar, LLP

(57) ABSTRACT

Provided is a cartridge assembly having first and second cartridges sealed by an interface member having a first sealing member along a radially outer surface thereof having a non-planar geometry around the outer surface and a second sealing member along the radially outer surface having a non-planar geometry around the outer surface. The sealing members may each have a repeating, undulating, non-planar geometry around the outer surface. The cartridges have ends with matching geometries to allow the cartridges to engage in surface-to-surface relation around their entire extents to create with the interface member an air tight seal.

20 Claims, 19 Drawing Sheets

Related U.S. Application Data

(60) Provisional application No. 61/433,611, filed on Jan. 18, 2011.

(51) Int. Cl.
*B01D 46/00* (2006.01)
*B01D 35/153* (2006.01)

(52) U.S. Cl.
CPC ....... *B01D 35/153* (2013.01); *B01D 46/0004* (2013.01); *B01D 2201/295* (2013.01); *B01D 2201/296* (2013.01); *B01D 2201/347* (2013.01); *B01D 2201/4046* (2013.01)

(56) References Cited

U.S. PATENT DOCUMENTS

| | | | |
|---|---|---|---|
| 4,786,409 | A | 11/1988 | Miller |
| 5,171,043 | A | 12/1992 | Ronda et al. |
| 6,283,305 | B1 | 9/2001 | Maeda et al. |
| 6,675,995 | B2 | 1/2004 | Stull et al. |
| 6,949,189 | B2 | 9/2005 | Bassett et al. |
| 7,494,017 | B2 | 2/2009 | Miller |
| 7,540,956 | B1 | 6/2009 | Kurth et al. |
| 7,771,595 | B2 | 8/2010 | Reynolds et al. |
| 8,603,334 | B2 | 12/2013 | Stamey et al. |
| 2003/0038088 | A1 | 2/2003 | Denys et al. |
| 2004/0103626 | A1 | 6/2004 | Warth et al. |
| 2006/0254975 | A1* | 11/2006 | Wolf ............ B01D 29/21 210/450 |
| 2008/0142426 | A1 | 6/2008 | Greco et al. |
| 2009/0277825 | A1* | 11/2009 | Beppu ............ B01D 63/106 210/321.74 |
| 2010/0064646 | A1* | 3/2010 | Smith ............ B01D 46/0005 55/501 |

FOREIGN PATENT DOCUMENTS

| | | |
|---|---|---|
| WO | 2006/012031 | 2/2006 |
| WO | 2009/012010 | 1/2009 |
| WO | 2010/117799 | 10/2010 |

OTHER PUBLICATIONS

International Preliminary Examination dated Sep. 3, 2012. Mailed to the European Patent Office in corresponding International Patent Application No. PCT/US2012/020697.

International Preliminary Report on Patentability dated Jan. 21, 2013 in corresponding International Patent Application No. PCT/US2012/020697.

International Search Report and Written Opinion dated Mar. 21, 2012 in corresponding International Application No. PCT/US2012/020697.

* cited by examiner

FILTER ELEMENT WAVE SEAL GLAND

RELATED APPLICATIONS

This application is a continuation-in-part of U.S. patent application Ser. No. 13/305,894 filed Nov. 29, 2011, which claims the benefit of U.S. Provisional Application No. 61/433,611 filed Jan. 18, 2011. The entire disclosures of these applications are hereby incorporated by reference.

FIELD OF INVENTION

The present invention relates generally to filter elements and filter modules, and to the interface between the element and a corresponding mating component.

In some filtration applications, a replaceable filter element has an end cap which is connected to the head of a filter module. The module includes a canister which receives the element, and inlet and outlet ports in the head which direct fluid into and out of the module. The fluid passes through the filter element, which separates particles and other contaminants from the fluid which is then returned to the operating system. In order for the filter element to properly function and not leak, a positive seal must be maintained with the filter head. Typically, hydraulic filter elements use an O-ring supported along a plane in a straight cut or radial seal gland design. A sloped or angled seal gland design has been used, for example as shown in U.S. Pat. No. 7,494,017 for "Filter Element With Off-Axis End Cap", issued to the assignee of the present invention.

SUMMARY OF INVENTION

A filter element is provided which includes an end cap having an annular body defining an opening into a central cavity of the element, and a sealing member circumscribing the body. According to one embodiment, the sealing member is located in a groove formed along a radially outer surface of the annular body, and has a non-planar geometry such as a repeating, undulating, multi-lobed geometry.

An axial, distal end of the filter element end cap also has a non-planar geometry, substantially matching the geometry of the sealing member.

The annular body of the filter element is closely received within a socket formed in a diaphragm in the head of the filter module, with the distal end of the end cap body fitting flush against a complementary undulating surface along a shoulder internal to the socket. The socket has an outer wall with an undulating end surface matching the undulating geometry of the sealing member, and an axial extent such that the wall sufficiently covers the sealing member around the entire circumferential extent of the end cap to provide a fluid-tight seal between the annular body of the filter element and the diaphragm.

The undulating geometry of the distal end of the end cap can have an amplitude, chosen such that when the element and diaphragm are out of alignment, a sufficient gap is provided to prevent the canister from being fully threaded onto the head; or if the gap is large enough, even to prevent the threads on the canister and head from inter-engaging. In other words, the canister cannot be properly screwed onto the head when the element is out of rotational alignment with the diaphragm, as the expanded element/diaphragm interface prevents the canister from being tightened-down. This can provide a visual cue that the element is not properly located within the module, or that an incorrect element is present.

The annular body can have one or more tabs projecting axially outward from the distal end, which can be positioned at the points of maximum amplitude of the distal end. The tabs along the distal end of the end cap body are received in slots in the shoulder of the socket, which can be positioned at the points of minimum amplitude along the surface of the shoulder. Alternatively the tabs and slots could be reversed, with the tabs on the diaphragm and the slots in the end cap. Either way, the tabs and slots further facilitate positioning and installing the element in the socket.

Advantages of the present invention include good seal retention in the undulating groove of the end cap; rapid in-phase engagement between the end cap and socket during assembly; and a robust, positive seal between the end cap and the socket even during high differential pressures across plugged media.

According to another aspect of the invention, a cartridge assembly is provided that includes a first cartridge including a first cartridge housing defining a first cavity and a first end cap coupled to an end of the first cartridge housing and defining an opening to the first cavity, a second cartridge including a second cartridge housing defining a second cavity and a second end cap coupled to an end of the second cartridge housing and defining an opening to the second cavity, the second end cap being configured to mate with the first end cap, and an interface member configured to be coupled to the second end cap, the interface member including a body defining an opening to the second cavity and having a first sealing member along a radially outer surface of the body having a non-planar geometry around the outer surface for sealing to the first cartridge, and a second sealing member along the radially outer surface of the body having a non-planar geometry around the outer surface for sealing to the second cartridge.

According to still another aspect of the invention, an interface member configured to seal to first and second cartridges is provided. The interface member includes a body having a first axial side, a second axial side opposite the first axial side, and an opening extending therethrough, a first sealing bead along a radially outer surface of the body having a repeating, undulating, non-planar geometry around the outer surface for sealing to the first cartridge, and a second sealing bead along the radially outer surface of the body having a repeating, undulating, non-planar geometry around the outer surface for sealing to the second cartridge.

According to yet another aspect of the invention, a cartridge assembly is provided that includes a cartridge including a cartridge housing defining a cavity and an end cap coupled to an end of the cartridge housing and defining an opening to the cavity, and an interface member configured to be coupled to the end cap, the interface member including a body defining an opening to the cavity and having a first sealing member along a radially outer surface of the body having a repeating, undulating, non-planar geometry for sealing to the cartridge, and a second sealing member along the radially outer surface of the body having a repeating, undulating, non-planar geometry for sealing to another cartridge.

According to a further aspect of the invention, an interface member configured to seal to first and second cartridges is provided. The interface member includes a body having a first axial side, a second axial side opposite the first axial side, and an opening extending therethrough, a first annular undulating bead along a radially outer surface of the body that undulates axially back and forth for mating with a correspondingly undulating surface of the first cartridge, and a second annular undulating bead along the radially outer surface of the body that undulates axially back and forth for mating with a correspondingly undulating surface of the second cartridge.

The foregoing and other features of the invention are hereinafter described in greater detail with reference to the accompanying drawings.

DETAILED DESCRIPTION

Figure 1:
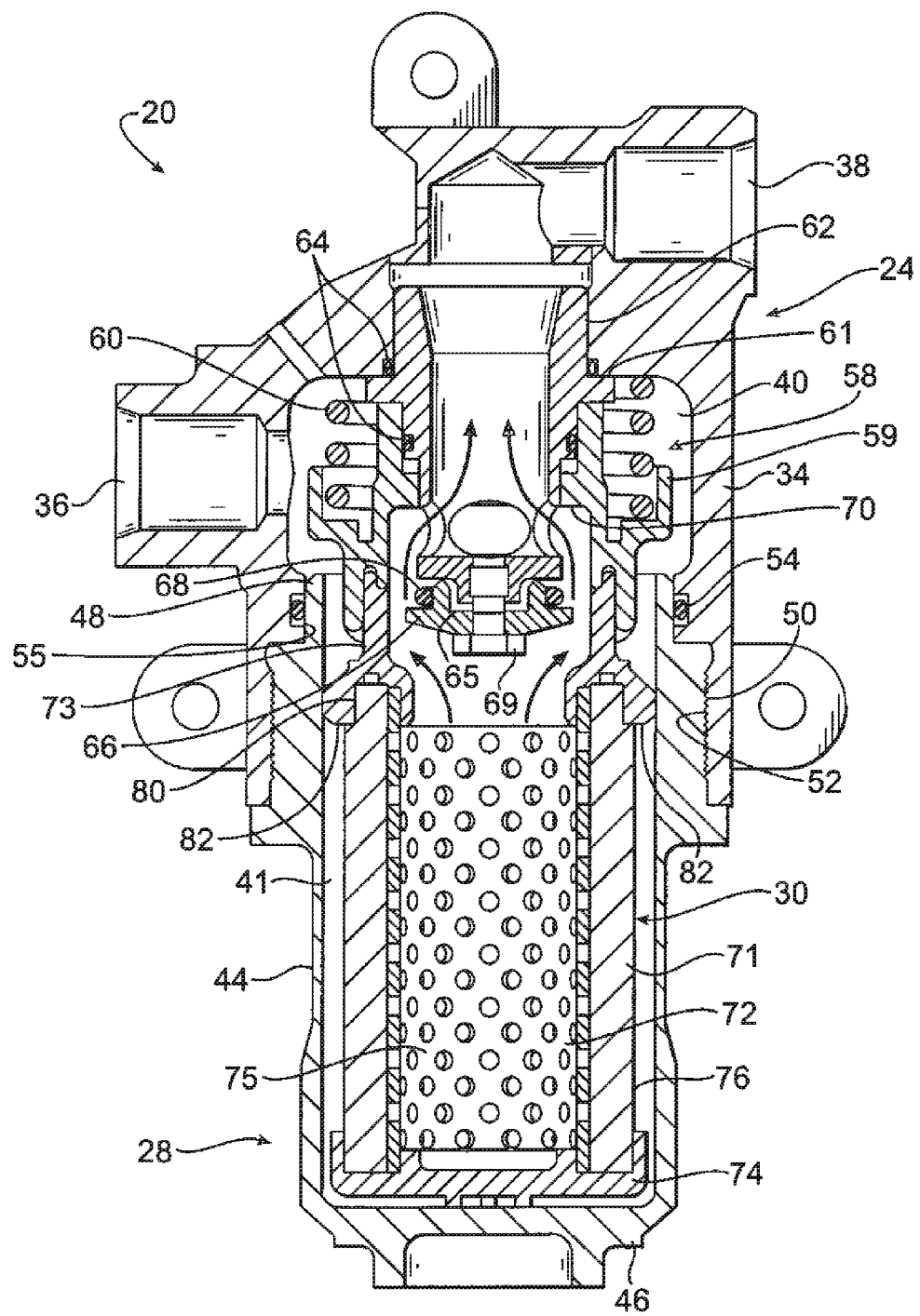
FIG. 1 is a cross-sectional side view of a filter module constructed according to the present invention, with the valve assembly in an open condition.

Referring to the Figures, and initially to FIG. 1, a filter module constructed according to the present invention is shown generally at 20. Filter module 20 can be used in a variety of applications, for example, hydraulic filter applications, where it is necessary or desirable to remove particulate and/or other contaminants from a hydraulic fluid stream. Module 20 generally includes a head assembly, indicated generally at 24, a cup-shaped bowl or canister, indicated generally at 28, and a filter element, indicated generally at 30, which is received and supported in bowl 28 and removes the contaminants and particulate in the fluid stream as it passes therethrough.

The head assembly 24 of the module includes a body 34 with an inlet port 36 which can be connected to receive fluid to be filtered from the system, and an outlet port 38 which can be connected to direct filtered fluid back to the system. Inlet port 36 directs incoming fluid into an inlet cavity 40 in the body where it can pass into a peripheral region 41 between the exterior of the element and the interior of the canister, as will be described in greater detail below. Body 34 can be formed in one or more pieces from any material appropriate for the particular application, such as metal; in any appropriate manner such as by die-casting and/or machining.

Canister 28 includes a sidewall 44, a closed end 46, and an open end 48. The open end 48 of the canister has a threaded exterior portion as at 50 which cooperates with a threaded interior portion 52 of body 34 of the filter head to enable the canister to be screwed onto and off of the head. Canister 28 can likewise be formed in one or more pieces from any material appropriate for the particular application, such as metal; in any appropriate manner such as by die-casting and/or machining. An appropriate seal such as at 54, supported within a groove in a land area 55 of body 34, can be provided between canister 28 and body 34 to ensure a fluid-tight connection when the canister and body are assembled together.

Head assembly 24 can further include a valve assembly, as at 58. Valve assembly 58 includes a diaphragm member 59, and a compression spring 60 which extends between the diaphragm member 59 and an upper, inside surface of the cavity 40. Diaphragm member 59 is slidingly supported on an adapter 61; while itself is retained within a neck portion 62 of body cavity 40 by cooperating threaded portions or other appropriate attachment techniques.

Appropriate O-ring gaskets as at 64 are provided between the adapter 61, diaphragm member 59 and body 34 as appropriate to prevent fluid leakage therebetween. Diaphragm member 59 is normally supported in an open position away from the distal open end 48 of the canister when a filter element 30 is located within the canister, and the canister is fully screwed onto the filter head, as illustrated in FIG. 1, to allow fluid flow from inlet 36 into the peripheral region 41 of the canister.

Valve assembly 58 further includes a seal assembly 65 supported internally of the lower, inner end of the adapter. Seal assembly 65 includes a stop collar 66, O-ring seal 68 supported around the periphery of the collar 66 and providing a seal against the surrounding adapter, and bolt 69 which retains the collar 66 together within the adapter. The diaphragm member 59 is likewise normally retained in a spaced-apart position from the seal assembly due to engagement by the upper end cap of the filter element when the canister is fully screwed onto the filter head, to allow filtered fluid to pass out from the canister and be directed to the outlet port 38.

Figure 14:
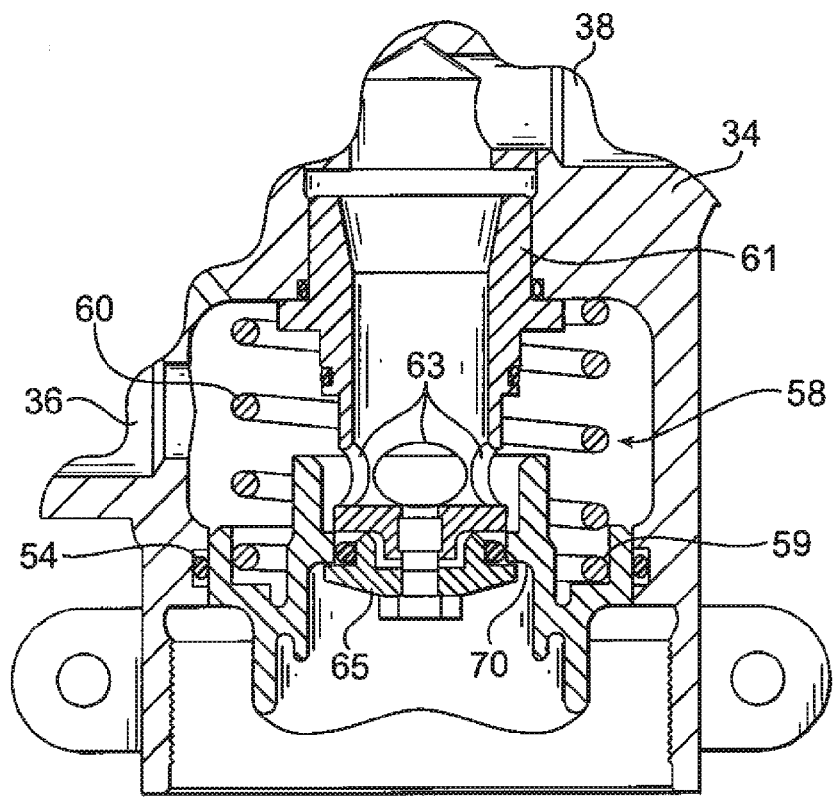
FIG. 14 is a cross-sectional side view of the filter module of FIG. 1, illustrating the valve assembly when the canister is removed.

If the canister is removed, such as to access and replace a spent filter element, the diaphragm member 59 is biased by compression spring 60 downwardly and internally within land area 55 of body 34 into a sealed and closed position by virtue of seal 54, as shown in FIG. 14. As the diaphragm member 59 moves into the closed position, an inner annular shoulder 70 of the diaphragm member simultaneously engages and seals against the seal assembly 65. Thus as should be apparent, valve assembly 58 completely closes the open end of the filter head when the canister is removed, to prevent fluid from leaking out of the head assembly.

Figure 2:
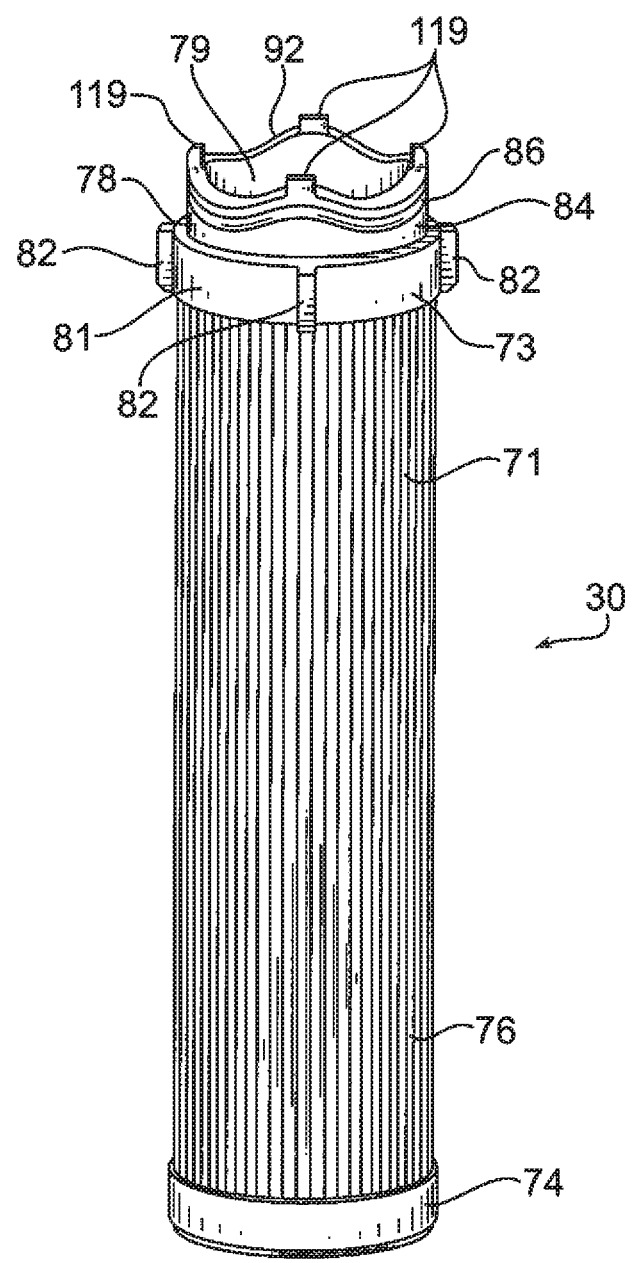
FIG. 2 is an elevated perspective view of a filter element for the module of FIG. 1, with the sealing member removed for clarity.

Referring now also to FIG. 2, filter element 30 includes a ring of filtration media 71 circumscribing a central axis and defining a central cavity 72, an upper end cap 73 at one end of the media ring, and a lower end cap 74 at the opposite end of the media ring. Media ring 71 can be formed any material appropriate for the particular application, and can be formed in any appropriate manner, such as by pleating. In some hydraulic filtration applications, the media ring will include a multi-layered pleated structure including a central perforated support core 75 and an outer support mesh 76, for additional support of the media during high pressure differentials and flow. End caps 73, 74 can likewise be formed in one or more pieces of any material appropriate for the particular application, for example, a hard, strong, chemically-resistant polymer, and formed using any appropriate technique, such as molding.

Figure 3:
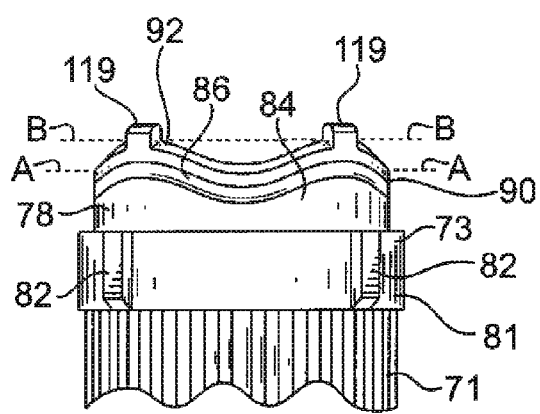
FIG. 3 is a side view of a portion of the filter element and upper end cap, the element and end cap having the same view when rotated in subsequent ninety degree increments.
Figure 4:
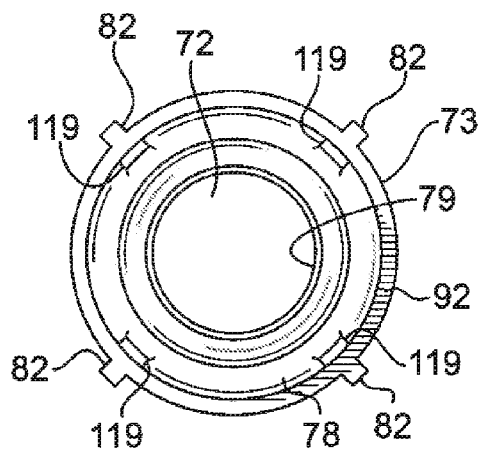
FIG. 4 is a top plan view of the filter element.
Figure 5:
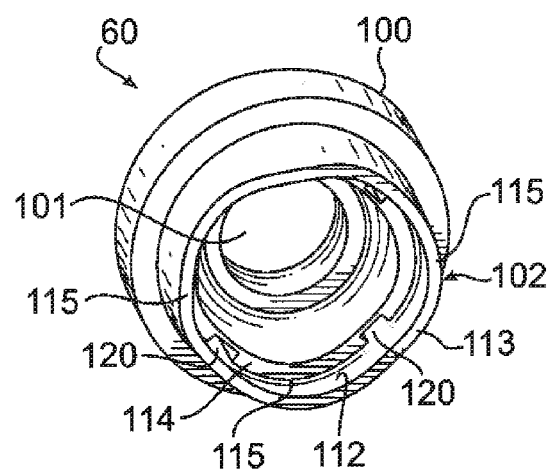
FIG. 5 is a perspective view from the bottom of the diaphragm.
Figure 6:
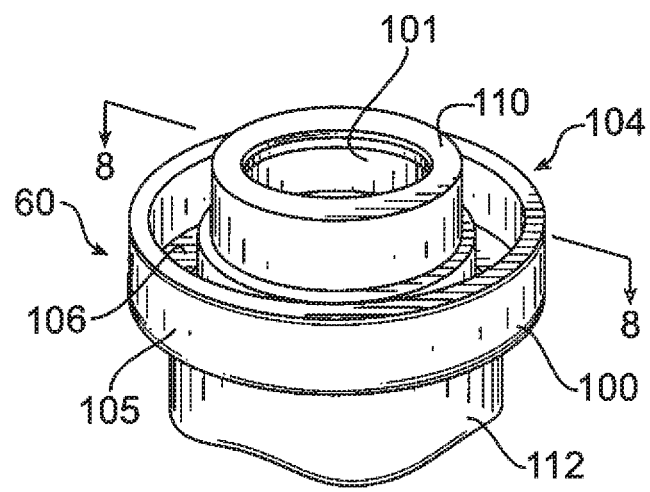
FIG. 6 is a perspective view from the top of the diaphragm.
Figure 7:
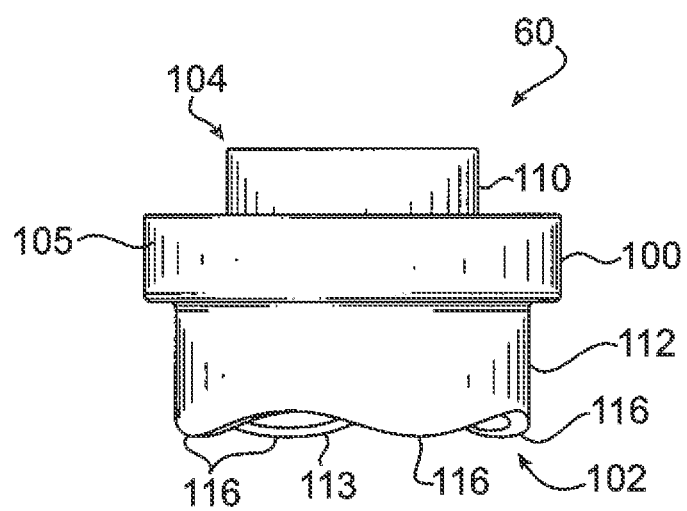
FIG. 7 is a side view of the diaphragm.
Figure 8:
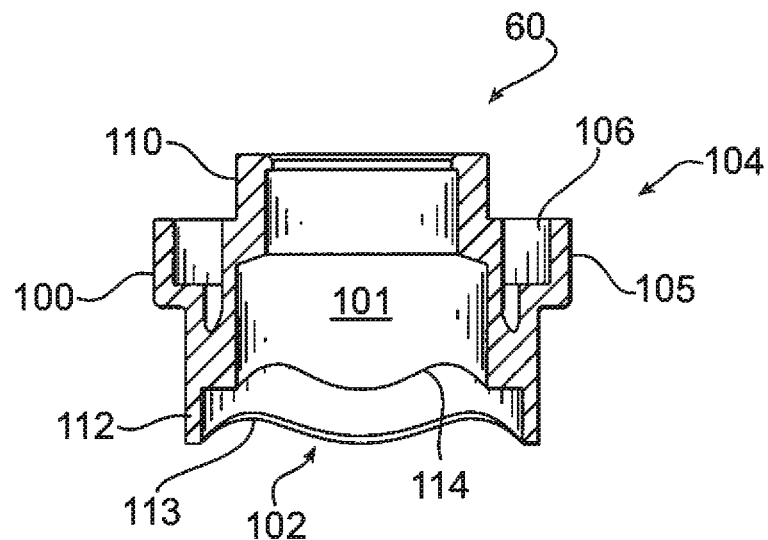
FIG. 8 is a cross-sectional side view of the diaphragm, taken substantially along the plane defined by the lines 8-8 in FIG. 6.
Figure 9:
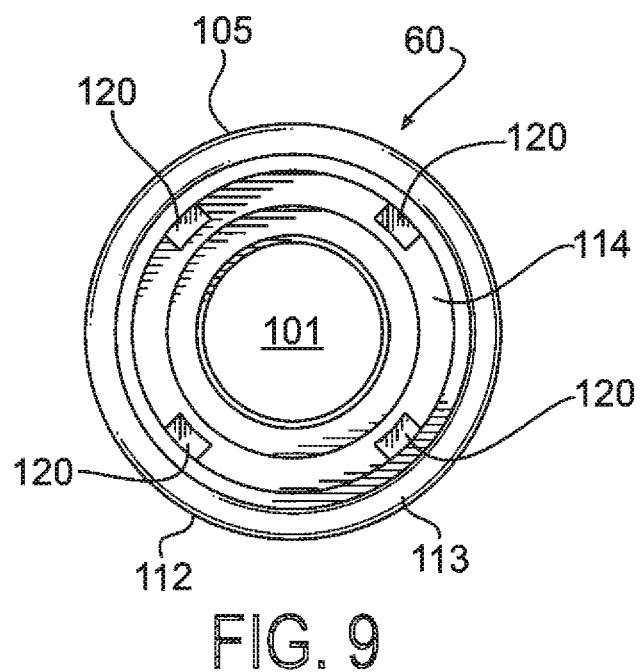
FIG. 9 is a bottom plan view of the diaphragm.

Referring now also to FIGS. 3 and 4, the upper end cap 73 includes an annular body 78 circumscribing a central opening 79 into the cavity 72 of the filter element. Body 78 includes a channel 80 (FIG. 1) in an inner end, which receives the end of the media ring 72 and support core 75. The end cap 73 is affixed in an appropriate manner, such as with adhesive or potting compound, to the media ring 72. End cap 73 further includes an enlarged annular base 81 having series of radially-outward projecting centering tabs as at 82, spaced equally around the peripheral circumference of the end cap and extending axially along the length of the annular base 81. Tabs 82 provide a stand-off gap between the end cap 73 and the inside surface of the canister 44 to properly orient and center the element when the element is located within the canister (see FIG. 1); while still allowing fluid flow from inlet 36 through the gaps between the tabs into the peripheral region 41. While four such tabs are illustrated, the number, geometry and spacing of the tabs can vary, as should be appreciated.

The body 78 of the end cap further includes an outer annular surface 84 having a channel or groove 86. Groove 86 can have a smoothly undulating, non-planar geometry, for example of a generally sinusoidal shape, repeating around the circumference of the body. Groove 86 can have a number of lobes equally spaced around the circumference of the body, that is, wave peaks or locations of maximum amplitude, around the circumference of the body. Four such lobes are illustrated in FIG. 2, however the number, spacing and geometry of the lobes can vary, as can the undulating geometry of the groove, as will be explained below. Only a single lobe may be necessary in certain applications.

As shown in FIG. 3, a sealing member 90 is located in groove 86 and substantially assumes the geometry of the groove. Sealing member 90 can be a standard elastomeric O-ring, although more complicated structures, such as an undulating shape substantially matching the shape of the groove, can also be used. The sealing member can have a diameter substantially the same as the width of the groove 86; while the depth of the groove is slightly shallower, such that the sealing member projects slightly outwardly from the groove for sealing against an opposing surface. The sealing member has a diameter such that it somewhat stretches when it is installed within the groove, to facilitate retention.

Alternatively, sealing member 90 can be formed unitarily with the end cap, such as by incorporating a resilient or flexible sealing material into the mold for the end cap. In such case, of course, only the sealing member will have the undulating shape described above and there would not be a separate groove. In addition, as described above, the seal gland is located on the outside diameter of the end cap body 78, which provides good O-ring retention during replacement operations. Alternatively, the seal could likewise be supported internally of the body 78 such as in a groove or channel. The reasons for the location and geometry of the sealing member will be further described below.

The distal outer end 92 of body 78 runs proximate the groove 86 (or sealing member 90) and can have a similar geometry. That is, the outer end 92 can have an edge or surface with the same undulating, non-planar geometry described above with respect to the groove 86 (and sealing member 90), in-phase and with the same amplitude.

Referring now to FIGS. 5-8, the diaphragm member 60 for the valve assembly 58 is illustrated, and includes an annular body 100 surrounding a central passage 101, and including a socket portion indicated generally at 102 and a valve portion indicated generally at 104. The valve portion 104 of the diaphragm includes an enlarged annular flange 105 circumscribing the body 100 and spaced apart therefrom to define an internal annular channel or groove 106 dimensioned to receive the end of compression spring 60. The lower annular shoulder of flange 105 forms a valve member, which as described previously, is sealed against seal 54 when the canister is removed from the head and the diaphragm member slides internally of body 34 due to compression spring 60. Flange 105 can have lead-in chamfers on the upper and lower outer edges of the flange to facilitate movement of the diaphragm member within the body 34 and seal 54. An annular sleeve 110 projects axially upward from the body 100 and is dimensioned to slidingly receive the adapter 61, as in FIG. 1.

Figure 11:
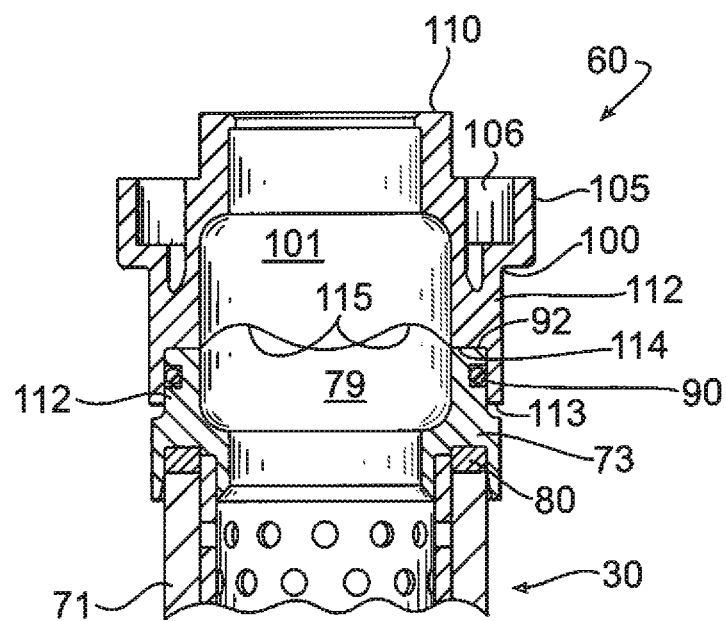
FIG. 11 is a cross-sectional side view of the element and diaphragm, taken substantially along the plane defined by the lines 11-11 of FIG. 10.

The lower, socket portion 102 of the diaphragm includes an outer annular wall 112 which projects downwardly from the body 100 and terminates in a distal end 113; and an internal annular shoulder 114, inwardly circumscribing the wall and facing the lower outer end of the diaphragm. The shoulder 114 has a smoothly undulating, non-planar geometry, of a generally sinusoidal shape, repeating around the circumference of the body, and substantially matching the undulating geometry of the distal end 92 of the end cap body 78, such that the end cap body can be located in substantial surface-to-surface engagement against the shoulder, as illustrated in FIG. 11. As with the end cap body, the shoulder 114 can have a number of equally-spaced lobes as at 115, that is, wave peaks, around the circumference of the body. The number, spacing and geometry of the lobes can vary depending upon the corresponding lobes formed in the end cap to achieve flush, surface-to-surface engagement, and enable rapid rotational alignment of the end cap relative to the socket.

Figure 10:
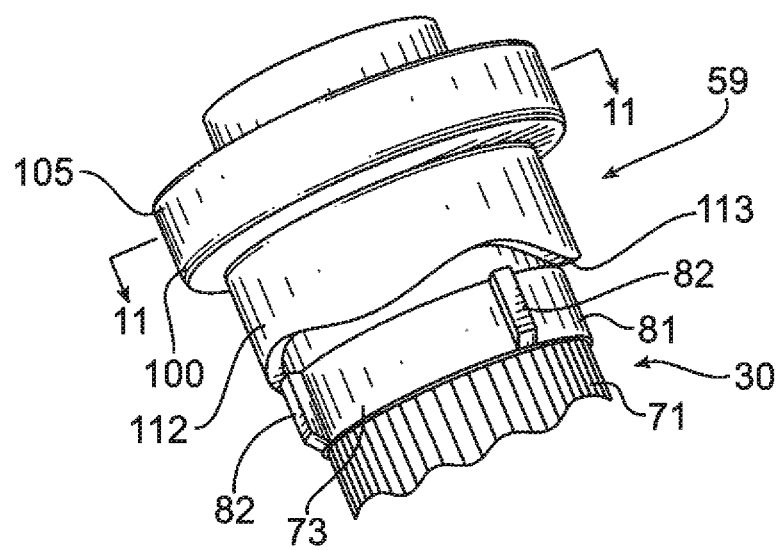
FIG. 10 is an elevated perspective view showing a portion of the element assembled with the diaphragm.

The annular wall 112 closely receives the body 78 of the end cap, and can have a lead-in chamfer to facilitate insertion over the sealing member 90 on the end cap. The distal end 92 of the end cap 73 can likewise have a lead-in chamfer to facilitate assembly with the diaphragm member. The distal end 113 of the wall can also have the repeating, undulating, non-planar geometry matching the geometry of the shoulder 114, including matching the undulations in phase and amplitude and having lobes 116 substantially matching lobes 115 in shoulder 114. Wall 112 has an axial extent sufficient to cover at least a major portion of the sealing member 90, that is, it extends at least sufficiently across sealing member 90 to prevent fluid leakage between the end cap and diaphragm, when the end cap is properly rotationally oriented within the diaphragm. FIG. 10, for example, illustrates the wall 112 having an axial extent completely covering the sealing member 90 and groove 86 when the end cap and diaphragm are in-phase with each other.

Figure 15:
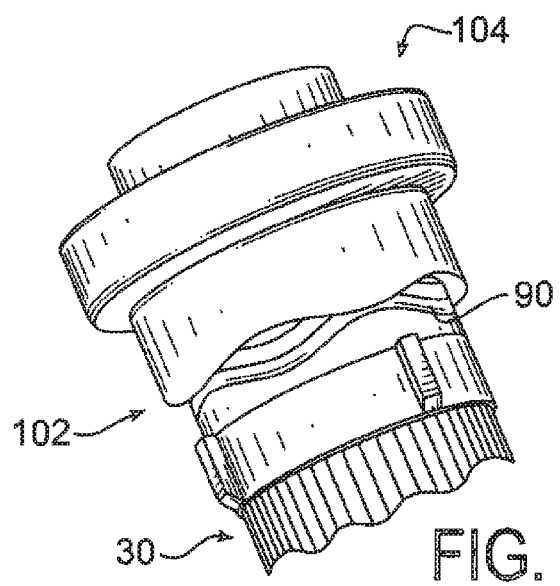
FIG. 15 is a side perspective view of the filter element and diaphragm, illustrating the element and diaphragm rotationally misaligned with one another.
Figure 16:
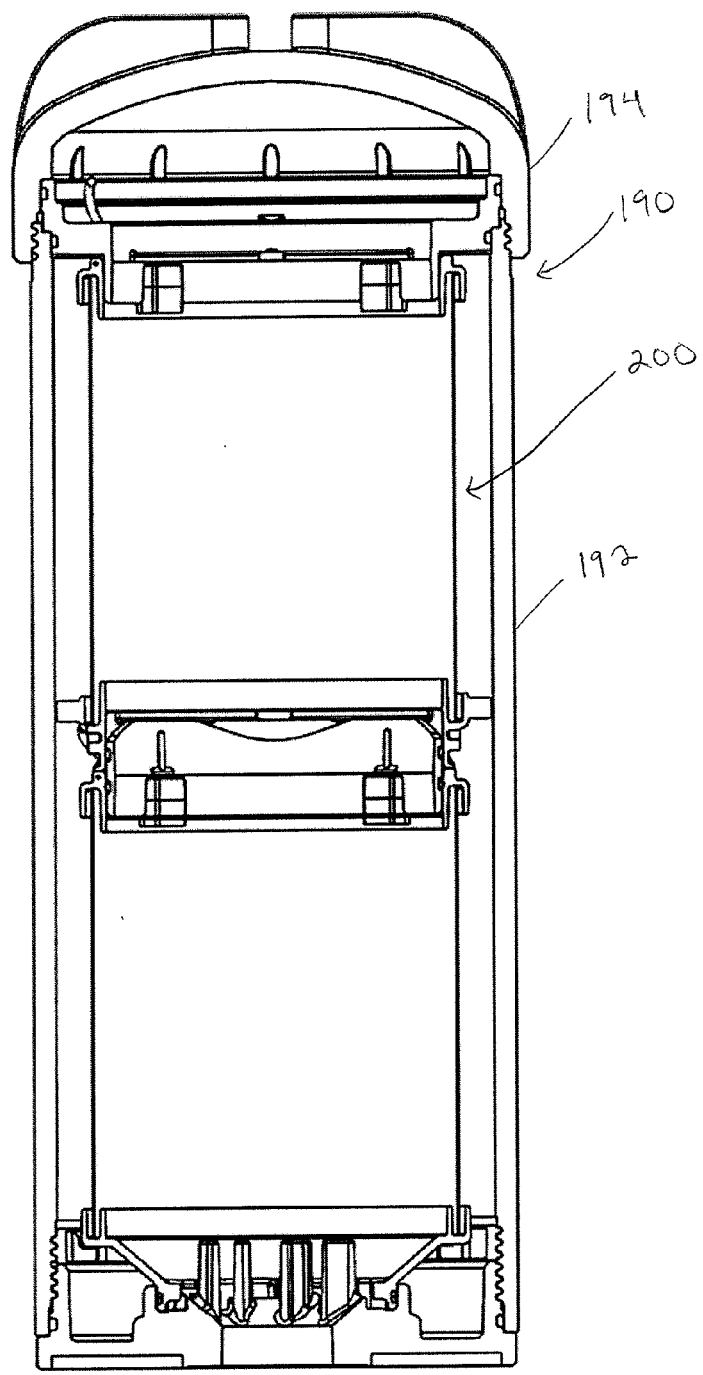
FIG. 16 is a cross-sectional view of a housing and an exemplary cartridge assembly according to the invention disposed in the housing.
Figure 17:
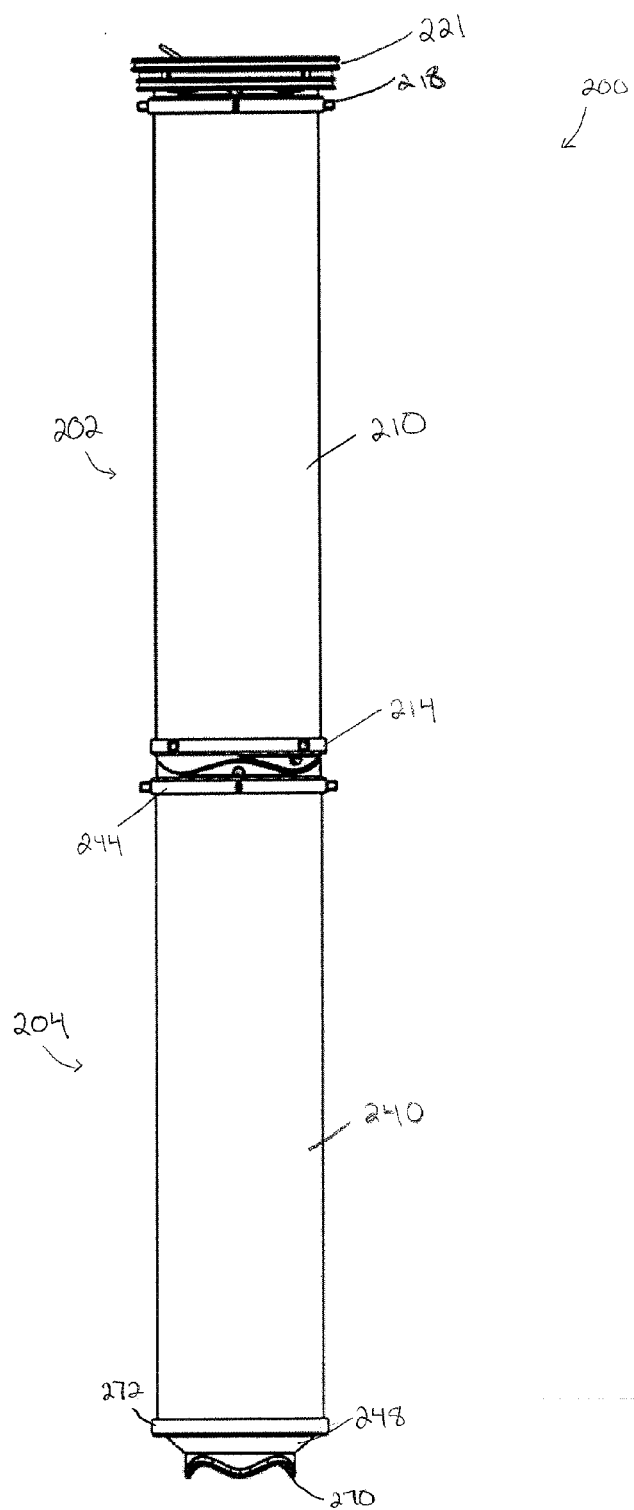
FIG. 17 is a front view of the exemplary cartridge assembly.
Figure 18:
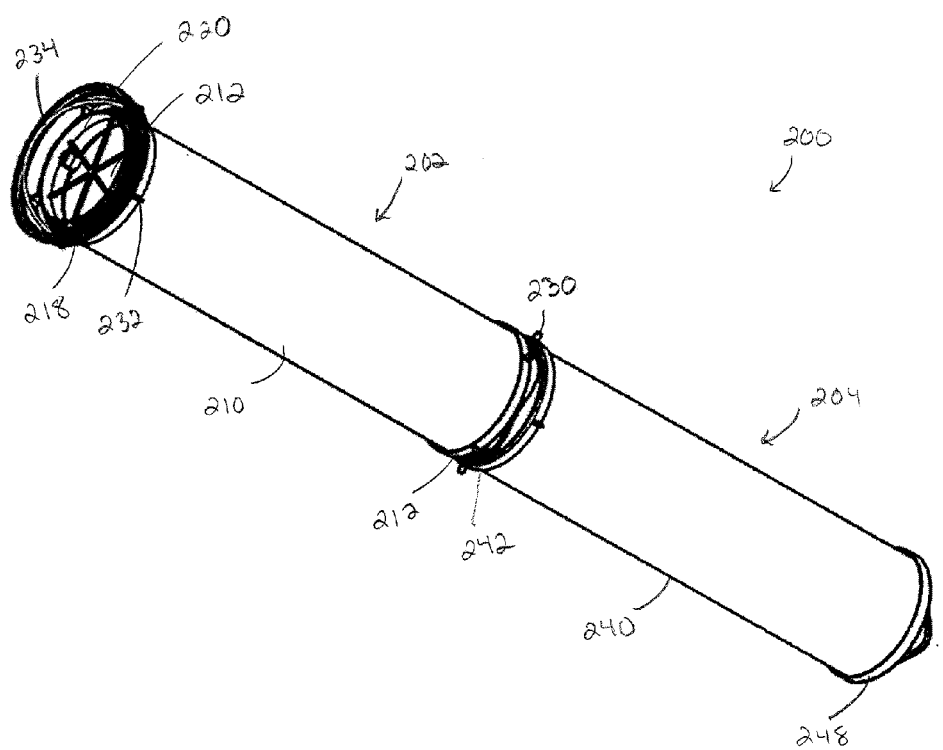
FIG. 18 is a perspective view of the cartridge assembly.
Figure 19:
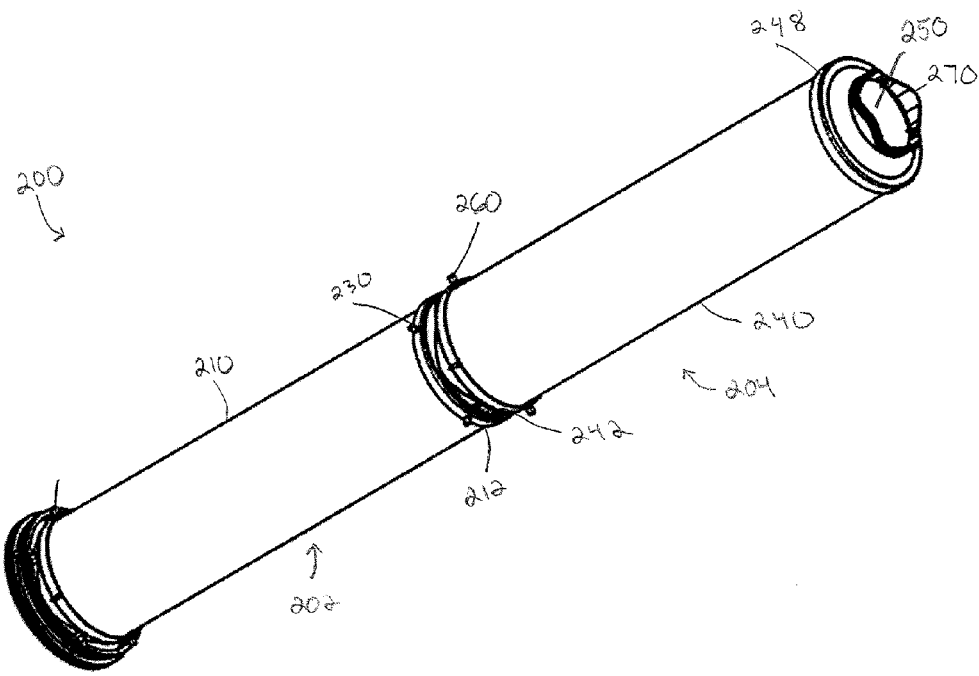
FIG. 19 is another perspective view of the cartridge assembly.
Figure 20:
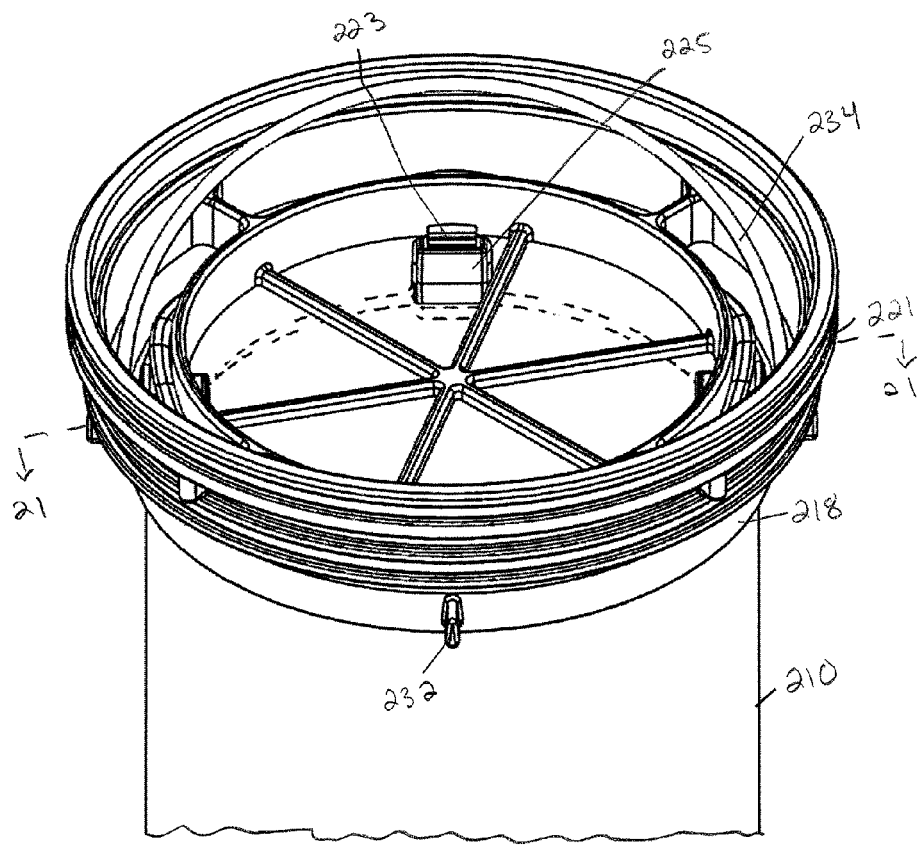
FIG. 20 is a perspective view of an end of a cartridge of the cartridge assembly.
Figure 21:
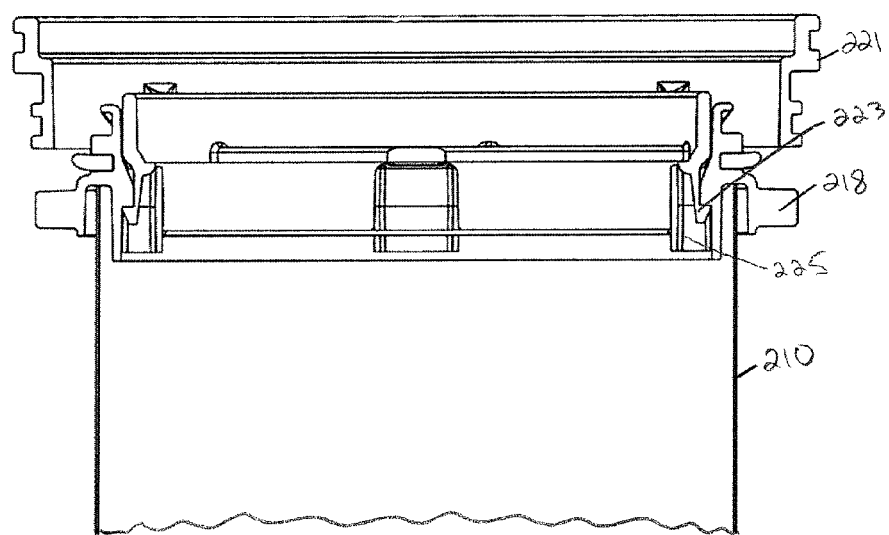
FIG. 21 is a cross-sectional view taken about line 21-21 in FIG. 20.
Figure 23:
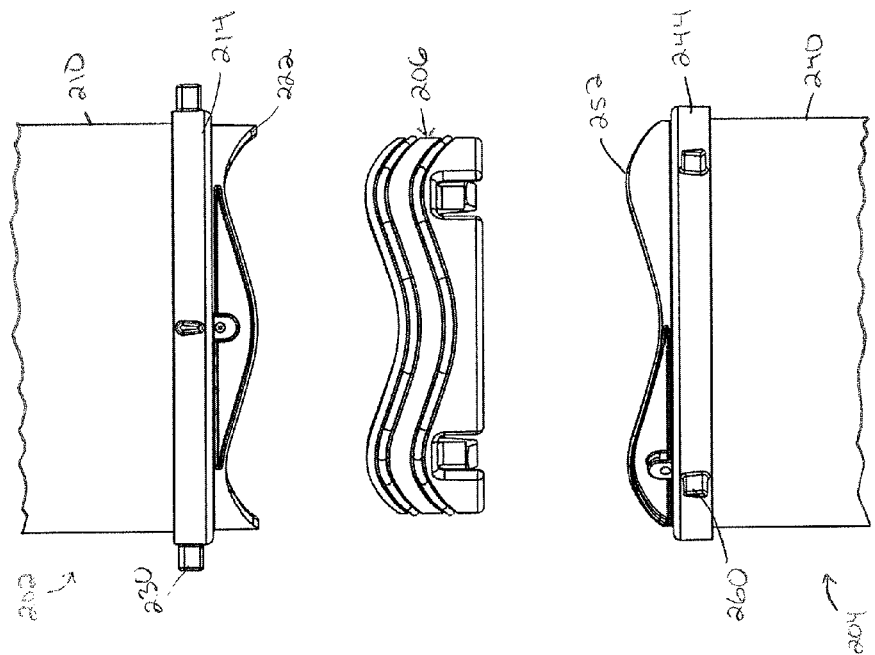
FIG. 23 is a front exploded view of the cartridge assembly.
Figure 22:
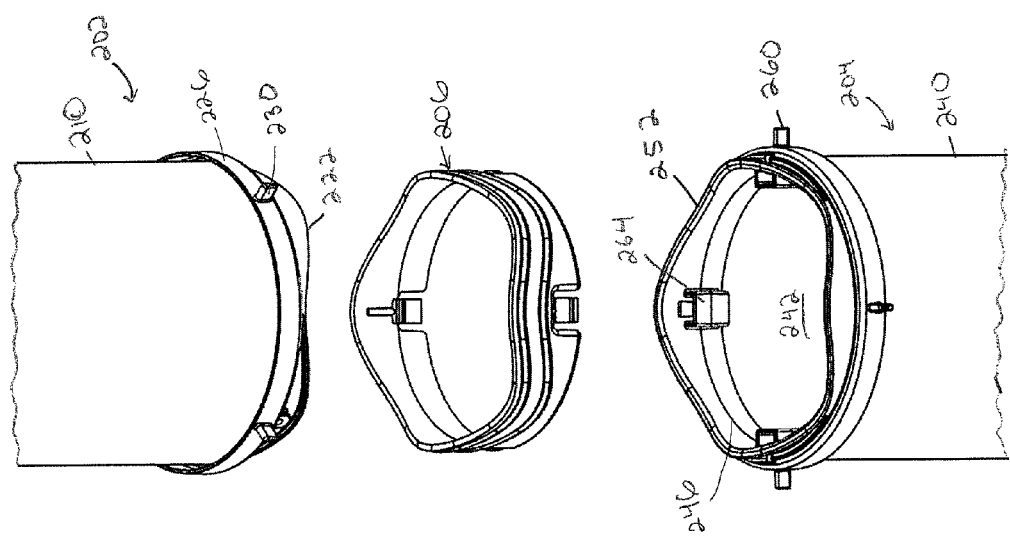
FIG. 22 is a perspective exploded view of the cartridge assembly.

When the element is properly in-phase with the diaphragm socket, such that the opposing undulating surfaces of end cap edge 92 and shoulder 114 are in surface-to-surface engagement, in-phase with each other, the side wall 112 seals along the entire extent of the sealing member 90 and a fluid-tight seal is provided between the end cap and the diaphragm. The interface establishes a linear load path between installed components during highly compressive states encountered during elevated differential pressure conditions. In contrast, referring to FIG. 15, should the element 30 be out-of-phase with the socket 102, the sealing member 90 will not fully seal against the inside surface of the socket, and a leak path will occur. The complementary geometries improve the positive engagement between the element end cap and diaphragm, improve the structural properties of both the element end cap and diaphragm during highly loaded conditions, and aides in the element assembly process. The slope of the lobes in the multi-lobe design provides good in-phase engagement between the element end cap and diaphragm during element replacement.

During element replacement, a fresh element can be located in any rotational orientation in the canister, and the canister is then threaded onto the filter head. Referring again to FIG. 1, as the canister is tightened, the end cap 73 of the element engages and pushes upwardly against the diaphragm and valve assembly, which is resisted by compression spring 60. The compression spring loads the element axially and causes the element to rotate into a neutral position, or in other words, into a position where the opposing surfaces of the end cap edge 92 and inner shoulder 114 are in-phase and in surface-to-surface alignment. As should be appreciated, with the illustrated four lobe design, the element only needs to be rotated ninety degrees until the opposing surfaces of the end cap edge 92 and the shoulder 114 are flush with one another. Should a two-lobe design be used, the element would be rotated one hundred eighty degrees to sit properly. A single lobe design would require up to a three hundred and sixty degree rotation to sit properly. Appropriate rotation for other lobe designs can be easily calculated. It is noted that non-planar geometries other than a lobe design could alternatively, or in addition, be used that would cause the element to be properly indexed and aligned with respect to the diaphragm. After the element is properly rotationally-oriented, the canister can be fully threaded onto the filter head and the system returned to operation.

The undulating geometry of the distal end 92 of the end cap 73 can be considered to have an amplitude along the axial direction, from a minimum amplitude "A" closest to the base 81—to a maximum amplitude "B" at the point farthest from the base, as illustrated in FIG. 3. The undulating geometry of groove 86, and hence seal 90, likewise has the same maximum and minimum amplitudes. The amplitude and the dimensions of the element and canister can be chosen such that when the element and diaphragm are out of alignment, a sufficient gap is provided to prevent the canister from being fully threaded onto the head; or if the gap is large enough, even to prevent the threads on the canister and head from inter-engaging. In other words, the canister cannot be properly screwed onto the head when the element is out of rotational alignment with the diaphragm, as the expanded element/diaphragm interface prevents the canister from being tightened-down. If the geometry of the end cap and of the canister are chosen appropriately to create such a gap, this can provide a visual cue that the element is not properly located within the module, or that an incorrect element is present. FIG. 3 illustrates an amplitude where the lowest point of the distal end, in the trough of their respective lobes, is co-planar with the highest point of the groove, at the apex of their respective lobes (that is, an imaginary plane perpendicular to the axis of the element would intersect these points); however as should be appreciated, this can vary depending upon the particular dimensions and geometry of the element and canister.

To facilitate installing and locating the element, a series of keyway tabs 119 can optionally be provided around the end 92 of the end cap. Tabs 119 project axially outward, away from the end of the body 78 of the end cap, and can also have a lead-in chamfer to facilitate assembly with the diaphragm member. As shown in FIGS. 2-4, each tab can be located generally at the apex of a lobe, or point of maximum amplitude, and as such, are generally also evenly-spaced around the end cap. Tabs 119 can be formed unitary (in one piece) with the end cap, or can be formed as separate piece(s) and is affixed (such as with adhesive) or otherwise supported against the end cap.

The diaphragm can likewise optionally include a series of slots as at 120 formed in the shoulder 114 of the diaphragm. The slots 120 are formed at the points of minimum amplitude of the shoulder, or in other words, at the low point of the wave geometry of the shoulder. The slots are dimensioned to receive the keyway tabs 119 in the end cap, to facilitate locating the end cap properly in-phase with the socket. Four slots 120 are illustrated which will receive four tabs 119 from the end cap—however the location, geometry and number of tabs and slots can vary. When the element is properly rotated with respect to the socket and in-phase therewith, the tabs are received within the slots and the element fits tightly within the socket ensuring positive engagement, as shown in FIG. 11. Again, in such case the outer wall 112 of the socket covers the sealing member 90, and a fluid-tight seal is provided between the end cap and the diaphragm.

When the end cap is out-of-phase with the socket (FIG. 15), the tabs 119 in the end cap ride against the surface of the diaphragm shoulder 114. This creates an even greater gap between the element end cap and diaphragm, and hence further facilitates preventing the canister from being properly screwed into the head, and thereby further facilitates the visual inspection of the filter assembly for an incorrect element.

As indicated above, the sealing member 90 in the end cap could be likewise located along the inside diameter of the end cap body 78. In such case, the socket 60 could have a wall configured to fit centrally within the end cap—rather than having a central cavity receiving the end cap. The remainder of the socket, such as the shoulder, tabs and slots could be the same as in the embodiment described previously, to ensure a robust, fluid-tight seal between the end cap and socket, and to facilitate assembly and installation. Also, it should be noted that the socket and end cap are described above as having complementary annular or circular configurations. It is possible that these members could have cooperating configurations other than round, such as oval, star-shaped, square, etc.

Figure 12:
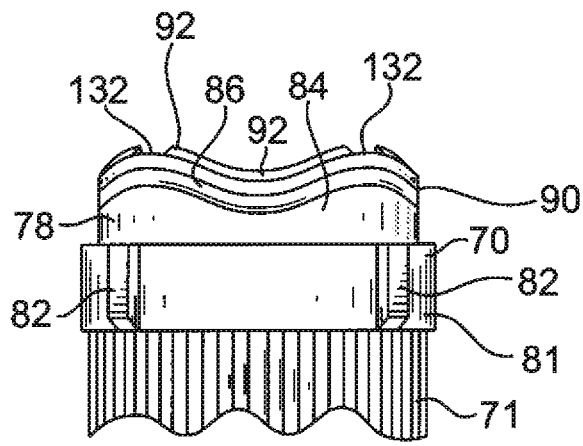
FIG. 12 is a side view of a portion of the filter element and upper end cap, according to a second embodiment of the present invention.
Figure 13:
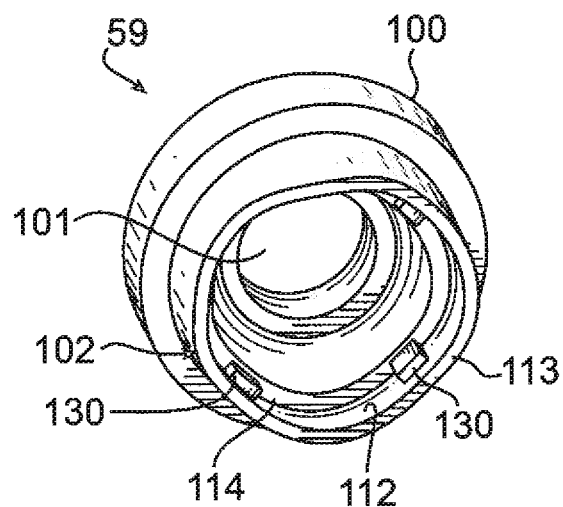
FIG. 13 is a perspective view from the bottom of the diaphragm, according to a second embodiment.

A further embodiment of the present invention is illustrated in FIGS. 12 and 13. In this embodiment, the key way tabs are indicated at 130, and are instead provided internal of the socket portion 102 of the diaphragm member, while the receiving slots, indicated at 132, are located in the end 92 of the end cap. The diaphragm and element fit together in the same way and are in other respects the same as described previously.

As should be appreciated from the above, some advantages of the present invention include good seal retention in the undulating groove of the end cap; rapid in-phase engagement between the end cap and socket during assembly; and a robust, positive seal between the end cap and the socket even during high differential pressures across plugged media.

Turning now to FIGS. 16-33, and initially to FIGS. 16-23, a cartridge assembly is shown generally at 200. The cartridge assembly may be inserted into a housing 190 of a dryer, for example, to dry air passing through the dryer. The housing includes a pressure retaining housing body 192 and a pressure retaining cap 194 coupled to the housing body to hold the cartridge assembly 200 in position, for example by a threaded connection. The cartridge assembly 200 may include first and second cartridges 202 and 204 that may be separately installed in the housing 190 of the dryer to mate within the housing to form a unified assembly for drying the air, and an interface member 206 for sealing to the first and second cartridges 202 and 204. By providing a two-piece assembly, the cartridges may be removed from the housing 190 of the dryer in an area having a low ceiling height. When installed in the housing 190 of the dryer, wet untreated air flows through the media, which may be for example loosed filled or immobilized media, contained within the cartridges 202 and 204 where the air is dried, and then the dry air flows between the cartridges and the housing of the dryer for downstream use.

Referring additionally to FIGS. 22-28, the first cartridge 202 includes a cartridge housing 210 defining a cavity 212, a first end cap 214 coupled to a first end of the cartridge housing 210 and defining an opening 216 to the cavity 212, a second end cap 218 coupled to a second end of the cartridge housing 210 and defining an opening 220 to the cavity 212, and an interface member 221. The first and second end caps 214 and 218 may be coupled to the cartridge housing 210 in any suitable manner, such as by an adhesive, welding, etc., or alternatively be unitarily formed with the cartridge housing 210. The interface member 221 may be coupled to the second end cap 218 in any suitable manner, such as by one or more tangs 223, and in the illustrated embodiment a plurality of axially extending tangs circumferentially spaced around the body of the interface member 221. The tangs 223 each have a radially outwardly projecting catch and are resiliently flexible for insertion into guides 225 in the second end cap 218 to engage respective ledges of the guides. It will be appreciated that the interface member 221 may be coupled to the second end cap 218 in a similar manner as described in detail below regarding the interface member 206 and end cap 244.

Disposed within the cavity 212 is a filter, such as an adsorbent filter having desiccant material for adsorbing moisture and/or other contaminants in air flowing through the cartridge housing 210. It will of course be appreciated that the cartridge may be suitable for any suitable filtration applications, such as hydrocarbon vapor removal from air or other gasses, $CO/CO_2$ removal from air, removal of oxygen from air (PSA Nitrogen generation), removal of trace contaminants from $CO_2$ or toxic contaminant removal from breathing air, etc.

The first end cap 214 has a first end 222 with an edge or surface with a repeating, undulating, non-planar geometry around the first end cap 214, for example of a generally sinusoidal shape, repeating around the circumference of the end cap, and a second end 224 extending into the cavity 212. The first end 222 may have a number of lobes equally spaced around the circumference of the end cap, that is, wave peaks or locations of maximum amplitude, around the circumference of the end cap 214. Four such lobes are illustrated in the figures, however the number, spacing and geometry of the lobes can vary, as can the undulating geometry. Only a single lobe may be necessary in certain applications.

The first end cap 214 may also have an annular skirt 226 defining with a wall of the end cap 214 a channel 228 for receiving the first end of the cartridge housing 210, and one or more tabs 230, and in the illustrated embodiment a plurality of circumferentially spaced tabs 230 projecting radially outwardly from the end cap 214. The plurality of tabs 230 may be provided for locating the cartridge 202 within the housing of the dryer and for spacing the cartridge 202 from the housing to allow a gap for dry air to flow between the cartridge 202 and the housing.

The second end cap 218 may be the same as end cap 244, which will be discussed in detail below, and the interface member 221 may be any suitable element to be supported in the housing of the dryer, such as the type described in U.S. Pat. No. 7,771,595 which is hereby incorporated herein by reference.

The second end cap 218 may have one or more tabs 232, and in the illustrated embodiment a plurality of circumferentially spaced tabs 232 projecting radially outwardly from the end cap 218. The plurality of tabs 232 may be provided for locating the cartridge 202 within the housing of the dryer and for spacing the cartridge 202 from the housing to allow a gap for dry air to flow between the cartridge 202 and the housing. The second end cap 218 may also include a handle 234 for an operator to hold when transporting the cartridge 202.

Similar to the first cartridge 202, the second cartridge 204 includes a cartridge housing 240 defining a cavity 242, a first end cap 244 coupled to a first end of the first cartridge housing 240 and defining an opening 246 to the cavity 242, and a second end cap 248 coupled to a second end of the cartridge housing 240 and defining an opening 250 to the cavity 242. The first and second end caps 244 and 248 may be coupled to the cartridge housing 240 in any suitable manner, such as by an adhesive, welding, etc., or alternatively be unitarily formed with the cartridge housing 210. Disposed within the cavity 242 of the cartridge housing 240 is a filter, such as an adsorbent filter for adsorbing moisture in air flowing through the cartridge housing 240. It will of course be appreciated that the filter may be any suitable filter as discussed above.

Figure 24:
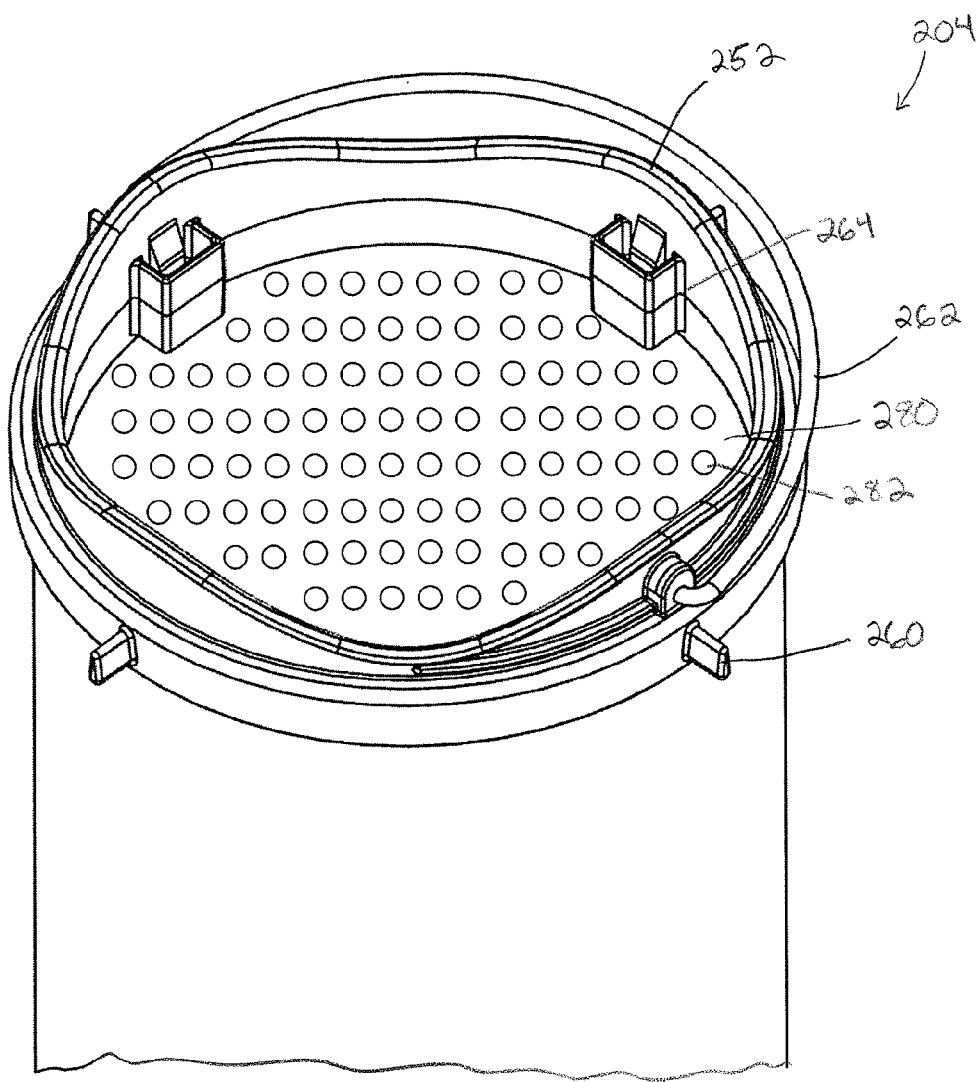
FIG. 24 is a perspective view of a cartridge of the cartridge assembly.

The first end cap 244 has a first end 252 with an edge or surface with a repeating, undulating, non-planar geometry around the first end cap 244, for example of a generally sinusoidal shape, repeating around the circumference of the end cap, and a second end 254 extending into the cavity 242. The first end 252 may have a number of lobes equally spaced around the circumference of the end cap, that is, wave peaks or locations of maximum amplitude, around the circumference of the end cap 244. Four such lobes are illustrated in FIG. 24, however the number, spacing and geometry of the lobes can vary, as can the undulating geometry. Only a single lobe may be necessary in certain applications.

The first end cap 244 may also have an annular skirt 256 defining with a wall of the end cap 244 a channel 258 for receiving the first end of the cartridge housing 240, one or more tabs 260 projecting radially outwardly from the end cap 244, a handle 262 for an operator to hold when transporting the cartridge 204, and one or more guides 264 along an inner wall of the end cap 244. The one or more tabs 260, and in the illustrated embodiment a plurality of circumferentially spaced tabs 260 may be provided for locating the cartridge 204 within the housing of the dryer and for spacing the cartridge 204 from the housing to allow a gap for dry air to flow between the cartridge 204 and the housing. The one or more guides 264, and in the illustrated embodiment a plurality of circumferentially spaced guides include a respective axially facing ledge or undercut 266 that receives the respective tang of the interface member 206 as will be discussed in detail below.

The second end cap 248 may be substantially similar to the above-described upper end cap 73. The second end cap 248 has a first end 270 with an edge or surface with a repeating, undulating, non-planar geometry around the second end cap 248, for example of a generally sinusoidal shape, repeating around the circumference of the end cap, and a second end (not shown) extending into the cavity 242. The first end 252 may have a number of lobes equally spaced around the circumference of the end cap, that is, wave peaks or locations of maximum amplitude, around the circumference of the end cap 248. Four such lobes are illustrated in the Figures, however the number, spacing and geometry of the lobes can vary, as can the undulating geometry. Only a single lobe may be necessary in certain applications. The second end cap 248 may also have an annular skirt 272 defining with a wall of the end cap 248 a channel (not shown) for receiving the second end of the cartridge housing 240.

As shown in FIG. 24, the second cartridge 204 may include a perforated disc 280 that retains the filter within the cavity 242 while allowing air flow through the cartridge 204 via a plurality of openings 282 in the disc. The disc 280 may be mechanically held in position by the interface member 206. Alternatively, the disc 280 may be coupled to the first end cap 244 and/or cartridge housing 240 in any suitable manner, such as by adhesive, welding, etc. It will also be appreciated that the first cartridge 202 may include a similar disc that retains the filter within the cavity 212, for example by being mechanically held in position by the interface member 221.

Referring now to FIGS. 22, 23 and 29-33, the interface member 206 will be described in detail. The interface member 206 includes an annular body 290 having a first axial side 292, a second axial side 294 opposite the first axial side 294, and an opening 296 extending therethrough, a first sealing member 298 along a radially outer surface 300 of the body 290, and a second sealing member 302 along the radially outer surface 300 of the body 290 axially spaced from the first sealing member 298. The first and second sealing member 298 and 302 protrude radially outwardly from the radially outer surface 300 of the body 290. The first sealing member 298 and the second sealing member 302 may be unitarily formed with the body 290 of the interface member 206, such as by incorporating a resilient or flexible sealing material into the mold for the interface member 206. Alternatively, the body 290 may include grooves 304 and 306 on the outer surface 300 for receiving the sealing member 298 and 302 similar to the groove shown in FIG. 3.

The first sealing member 298 has a repeating, undulating, non-planar geometry around the outer surface of the body 290 for sealing to the first end cap 214 of the first cartridge 202. The first sealing member 298 may have a number of lobes equally spaced around the circumference of the interface member, that is, wave peaks or locations of maximum amplitude, around the circumference of the interface member 206. Four such lobes are illustrated in the Figures, however the number, spacing and geometry of the lobes can vary, as can the undulating geometry. Only a single lobe may be necessary in certain applications. The geometry of the first sealing member 298 matches the geometry of the first end 222 of the first end cap 214 of the first cartridge 202.

The second sealing member 302 has a repeating, undulating, non-planar geometry around the outer surface of the body 290 for sealing to the first end cap 244 of the second cartridge 204. The second sealing member 302 may have a number of lobes equally spaced around the circumference of the interface member, that is, wave peaks or locations of maximum amplitude, around the circumference of the interface member 206. Four such lobes are illustrated in the Figures, however the number, spacing and geometry of the lobes can vary, as can the undulating geometry. Only a single lobe may be necessary in certain applications. The geometry of the second sealing member 302 matches the geometry of the first end 252 of the first end cap 244 of the second cartridge 204.

Figure 29:
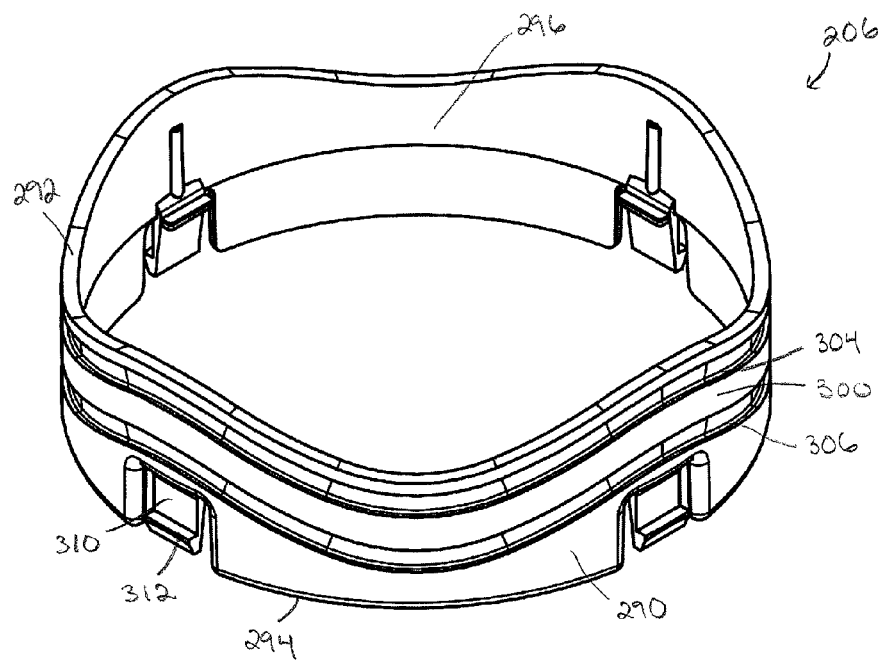
FIG. 29 is a perspective view of an exemplary interface member according to the invention.
Figure 30:
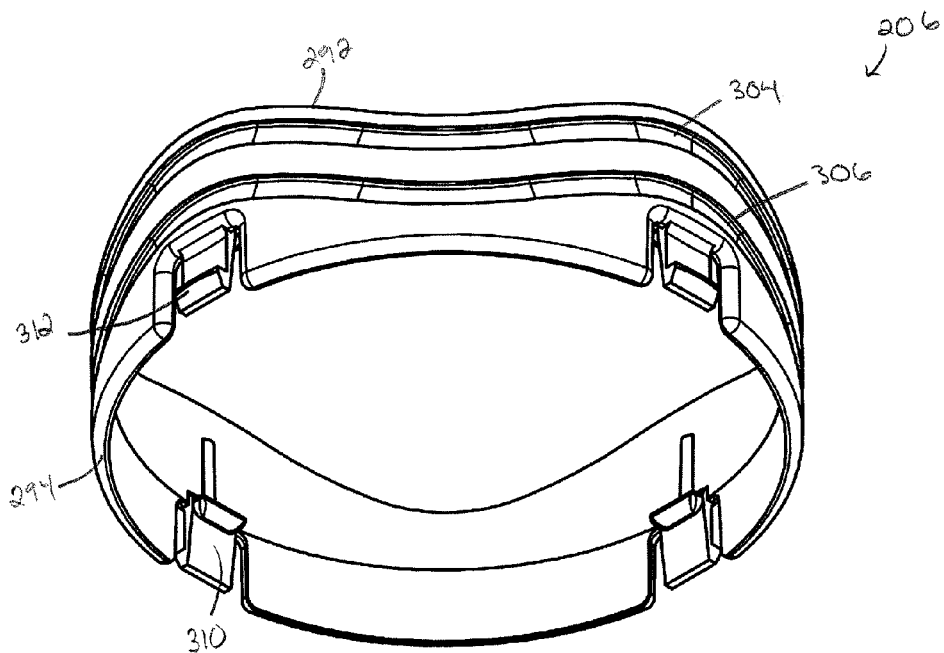
FIG. 30 is another perspective view of the interface member.
Figure 31:
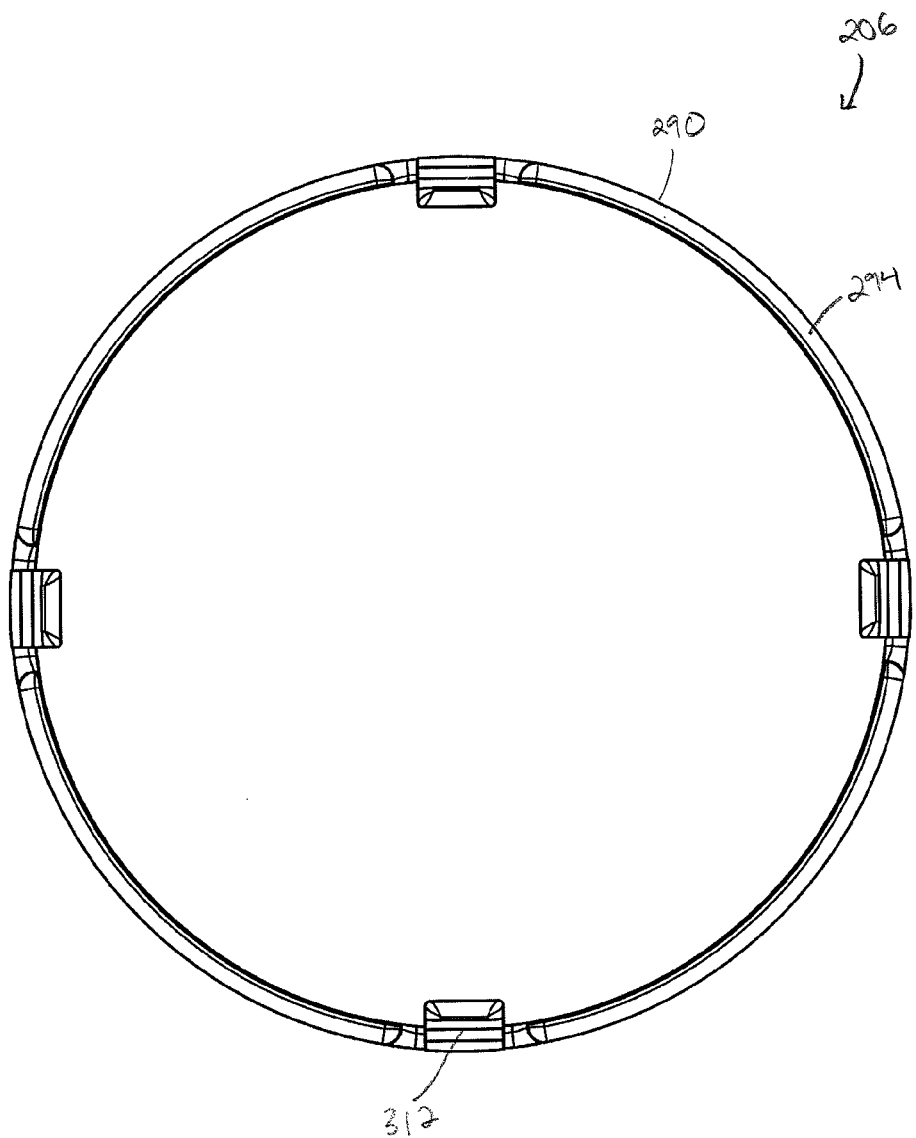
FIG. 31 is a bottom view of the interface member.
Figure 32:
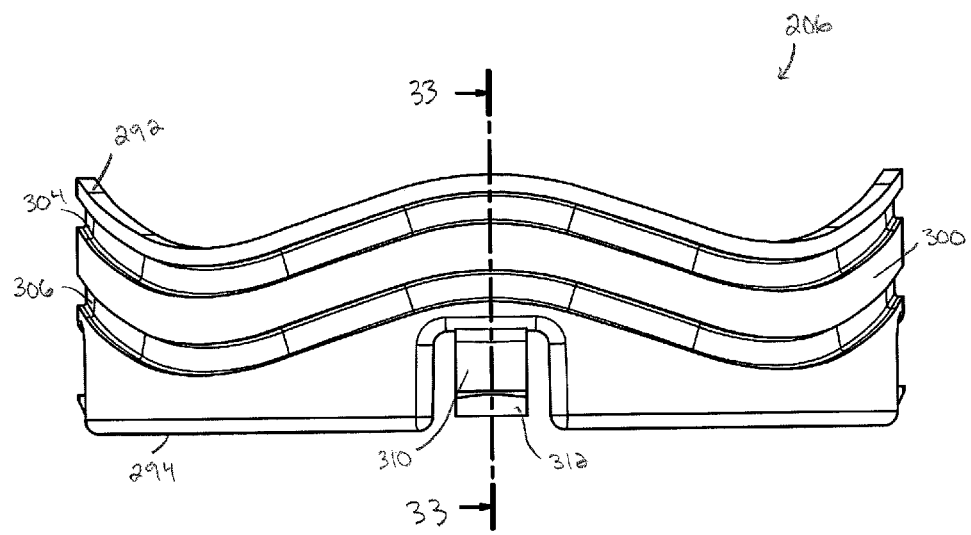
FIG. 32 is a front view of the interface member.
Figure 33:
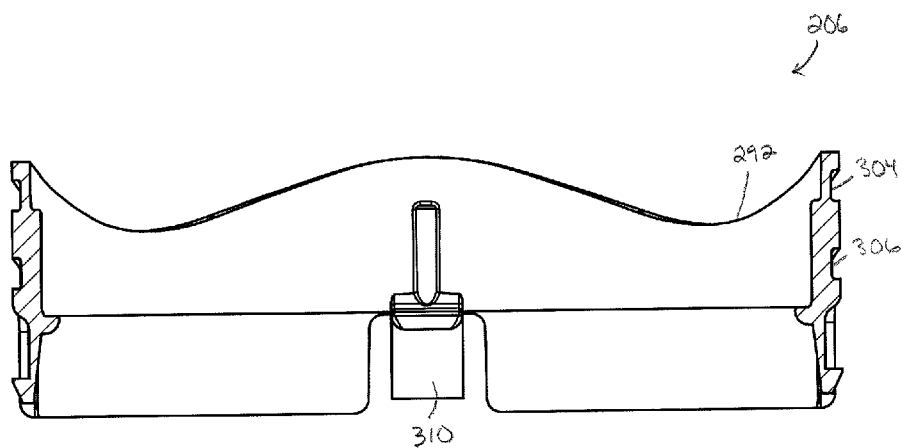
FIG. 33 is a cross-sectional view of the interface member taken about line 33-33 in FIG. 32.

The first axial side 292 of the body 290 of the interface member 206 has a repeating, undulating, non-planar geometry around the body 290 that matches the geometry of the first and second sealing members 298 and 302. The first axial side 298 may have a number of lobes equally spaced around the circumference of the interface member, that is, wave peaks or locations of maximum amplitude, around the circumference of the interface member 206. Four such lobes are illustrated in FIG. 29, however the number, spacing and geometry of the lobes can vary, as can the undulating geometry. Only a single lobe may be necessary in certain applications.

Extending toward the second axial side 294 is one or more tangs 310, and in the illustrated embodiment a plurality of axially extending tangs circumferentially spaced around the body 290. The tangs 310 each have a radially outwardly projecting catch 312 and are resiliently flexible for insertion into the guides 264 to engage the respective ledge 266 to locate the interface member relative to the second cartridge and to couple the interface member 206 to the first end cap 244 of the second cartridge 204. The tangs extend toward but not past the second axial side 294.

Figures 25, 26:
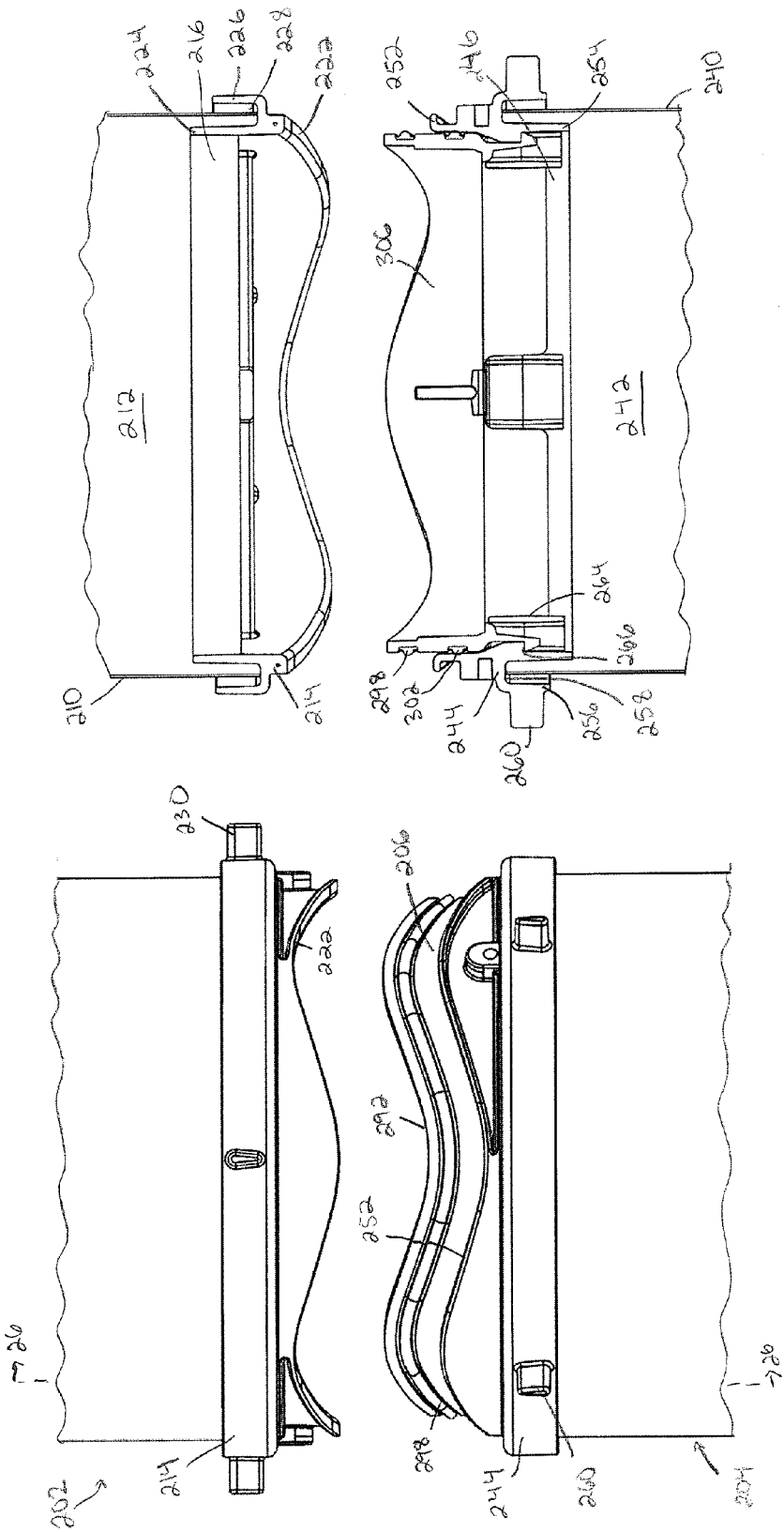
FIG. 25 is a front view of a first cartridge and a second cartridge uncoupled from one another.
FIG. 26 is a cross-sectional view taken about line 26-26 in FIG. 25.

Referring again to FIGS. 25-28, to assembly the cartridge assembly 200, the interface member 206 is inserted into the opening 246 of the first end cap 244 of the second cartridge 204. The interface member 206 is aligned with the first end cap 244 by aligning the tangs 310 with the guides 264, and then advanced through the opening 246 towards the second send 254 until the tangs 310 engage the ledges 266 to secure the interface member 206 to the first end cap 204. When the interface member 206 is secured to the first end cap 244, the second sealing member 302 seals to an inner wall of the first end cap 244 as shown in FIG. 26.

Figure 27:
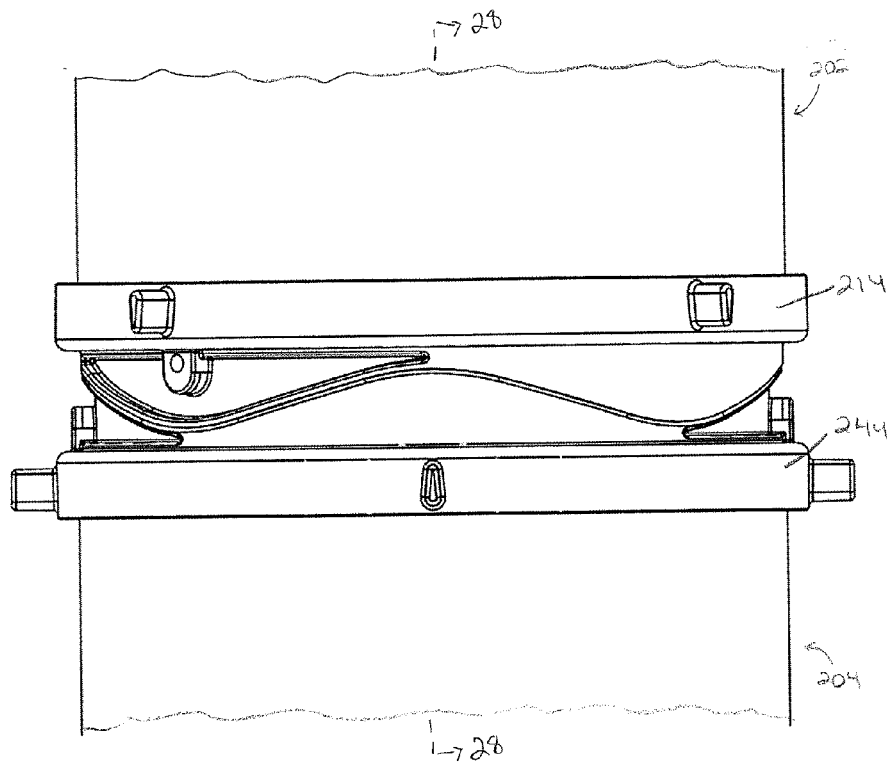
FIG. 27 is a front view of a first cartridge and a second cartridge coupled together.
Figure 28:
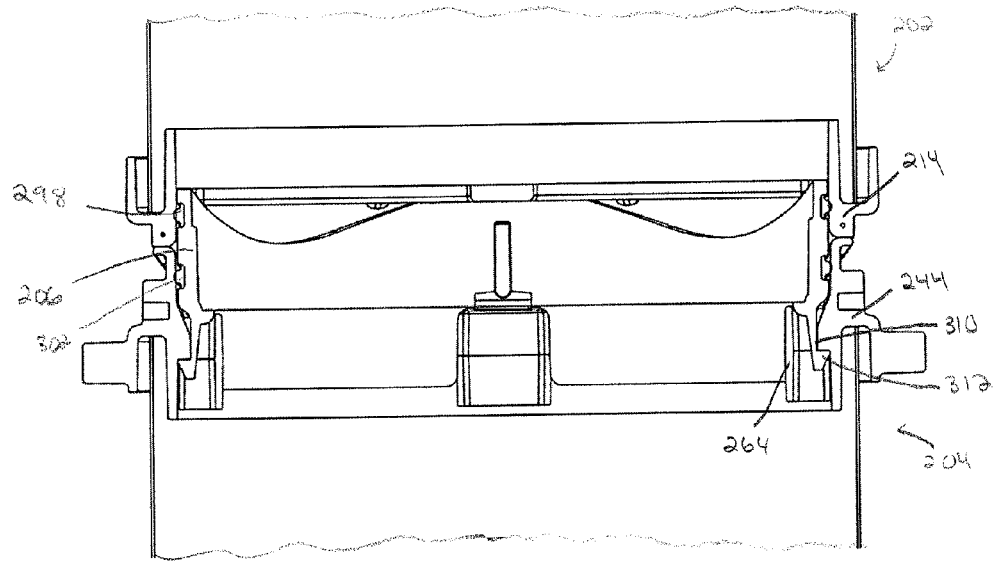
FIG. 28 is a cross-sectional view taken about line 28-28 in FIG. 27.

The first and second cartridges 202 and 204 may then be assembled together, for example within the housing of the dryer. The interface member 206, which is now coupled to the second cartridge 204, is inserted into the opening 216 of the first end cap 214 of the first cartridge 202 such that the first axial end 292 is within the end cap 214. As shown in FIG. 27, the first and second cartridges are then aligned such that the lobes of the first end cap 214 of the first cartridge 202 mate with the recesses between lobes of the first end cap 244 of the second cartridge 204, and the lobes of the first end cap 244 mate with the recesses between lobes of the first end cap 214. When the first and second cartridges 202 and 204 are aligned, the first sealing member 298 seals to an inner wall of the first end cap 214 as shown in FIG. 28. Due to the geometry of the first end 222 of the first end cap 214 matching the geometry of the first end 252 of the first end cap 244, the ends 222 and 252 engage in surface-to-surface relation around the entire extent of the end caps to create an air tight seal. If the first and second cartridges 202 and 204 are not properly aligned, the first sealing member 298 will be out of sync with the geometry of the first end 222 of the first end cap 214, thereby resulting in a leak path between the cartridges 202 and 204. To correct the alignment, the first and second cartridges 202 and 204 may be rotated relative to one another to be aligned as discussed above.

During use, the wet untreated air flows into the second cartridge 204 via the opening 250 in the second end cap 248. The air flows through the desiccant material of the adsorbent filter where moisture is adsorbed, and then out of the second cartridge 204 at the first end cap 244. The air then flows through the first end cap 214 into the first cartridge 202, where the air flows through the desiccant material of the adsorbent cartridge where any remaining moisture is adsorbed. Dry air then exits the first cartridge 202 at the second end cap 218. Due to the seal between the first end caps 214 and 244 provided by the interface member 206, the wet air in the cartridges 202 and 204 will not mix with the dry processed air outside the cartridges 202 and 204.

The principles, preferred embodiments and modes of operation of the invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A cartridge assembly including:
  a first cartridge including a first cartridge housing defining a first cavity and a first end cap coupled to an end of the first cartridge housing and defining an opening to the first cavity wherein the first end cap has a distal outer end along an end surface thereof having a plurality of axially extending portions relative to a radial plane extending through the end cap;
  a second cartridge including a second cartridge housing defining a second cavity and a second end cap coupled to an end of the second cartridge housing and defining an opening to the second cavity, the second end cap being configured to mate with the first end cap; and
  an interface member configured to be coupled to the second end cap, the interface member including a body defining an opening to the second cavity and having a first sealing member along a radially outer surface of the body having a plurality of axially extending portions relative to a radial plane extending through the interface member that run along and around the radially outer surface of the body for sealing to the first cartridge, and a second sealing member along the radially outer surface of the body having a non-planar geometry around the outer surface for sealing to the second cartridge.

2. The cartridge assembly according to claim 1, wherein the first and second sealing members each have a repeating, undulating, non-planar geometry around the outer surface.

3. The cartridge assembly according to claim 1, wherein the first end cap has a distal outer end with a repeating, undulating, non-planar geometry around the first end cap and wherein the second end cap has a distal outer end with a repeating, undulating, non-planar geometry around the second end cap.

4. The cartridge assembly according to claim 3, wherein the geometry of the distal end of the first end cap matches the geometry of the distal end of the second end cap such that the distal end of the first end cap engages in surface-to-surface relation the distal end of the second end cap around the entire extent of the first end cap.

5. The cartridge assembly according to claim 3, wherein the distal end geometry of each end cap includes a plurality of lobes spaced around the respective body.

6. The cartridge assembly according to claim 5, wherein the plurality of lobes of each end cap are equally spaced around the respective body.

7. The cartridge assembly according to claim 3, wherein the geometry of the first sealing member matches the geometry of the distal end of the first end cap, and the geometry of the second sealing member matches the geometry of the distal end of the second end cap.

8. The cartridge assembly according to claim 1, wherein the interface member has a distal outer end with a repeating, undulating, non-planar geometry around the body.

9. The cartridge assembly according to claim 1, wherein the interface member includes a plurality of axially extending tangs circumferentially spaced around the body.

10. The cartridge assembly according to claim 9, wherein the second end cap include a plurality of guides circumferentially spaced around the end cap, and wherein each guide receives a respective one of the plurality of axially extending tangs to couple the interface member to the second cartridge.

11. The cartridge assembly according to claim 1, further including a filter disposed in the first cartridge housing and a filter disposed in the second cartridge housing.

12. The cartridge assembly according to claim 1, wherein the first sealing member and the second sealing member are formed unitarily with the interface member.

13. The cartridge assembly according to claim 1, wherein the interface member is received in the openings in the first and second end caps such that the first sealing member seals to an inner wall of the first end cap and the second sealing member seals to an inner wall of the second end cap.

14. An interface member configured to seal to first and second cartridges, the interface member including:
  a body having a first axial side, a second axial side opposite the first axial side, and an opening extending therethrough;

a first sealing bead along a radially outer surface of the body having a repeating, undulating, non-planar geometry around the outer surface for sealing to the first cartridge; and a second sealing bead along the radially outer surface of the body having a repeating, undulating, non-planar geometry around the outer surface for sealing to the second cartridge;

wherein the first axial side has a repeating, undulating, non-planar geometry around the body.

15. The interface member according to claim 14, wherein the first axial side has a repeating, undulating, non-planar geometry around the body.

16. The interface member according to claim 14, wherein the tangs extend toward the second axial side.

17. The interface member according to claim 14, wherein the first sealing bead and the second sealing bead are formed unitarily with the interface member.

18. The interface member according to claim 14, further including a plurality of axially extending tangs circumferentially spaced around the body.

19. An interface member configured to seal to first and second cartridges, the interface member including:

a body having a first axial side, a second axial side opposite the first axial side, and an opening extending therethrough;

a first annular undulating bead along a radially outer surface of the body that undulates axially back and forth for mating with a correspondingly undulating surface of the first cartridge; and a second annular undulating bead along the radially outer surface of the body that undulates axially back and forth for mating with a correspondingly undulating surface of the second cartridge;

wherein the first axial side has a repeating, undulating, non-planar geometry around the body.

20. The interface member according to claim 19, wherein the first and second annular undulating beads each define a plurality of axially outwardly raised portions that are equally circumferentially spaced apart by recessed portions, and wherein the raised portions and recessed portions protrude radially outwardly from the radially outer surface of the body.

* * * * *